(12) United States Patent
Tian et al.

(10) Patent No.: US 11,362,528 B2
(45) Date of Patent: Jun. 14, 2022

(54) MITIGATION OF AUDIBLE OUTPUT IN A CHARGING CIRCUIT

(71) Applicant: Microsoft Technology Licensing, LLC, Redmond, WA (US)

(72) Inventors: Junzhuo Tian, Bellevue, WA (US); Jui Tong Tan, Bellevue, WA (US); Andrew Lawrence, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 16/447,379

(22) Filed: Jun. 20, 2019

(65) Prior Publication Data

US 2020/0403424 A1    Dec. 24, 2020

(51) Int. Cl.
*H02J 7/00*    (2006.01)

(52) U.S. Cl.
CPC ......... *H02J 7/0031* (2013.01); *H02J 2207/10* (2020.01)

(58) Field of Classification Search
CPC .................................................. H02J 7/0031
USPC ....................................................... 320/134
See application file for complete search history.

(56) References Cited

U.S. PATENT DOCUMENTS

| 5,126,589 | A | 6/1992 | Renger |
| 6,363,303 | B1 | 3/2002 | Bertness |
| 6,781,356 | B1 | 8/2004 | Yang et al. |
| 9,263,043 | B2 | 2/2016 | Snyder et al. |
| 9,614,437 | B2 | 4/2017 | Yuan |
| 10,250,048 | B2 | 4/2019 | Wen |
| 2008/0122518 | A1* | 5/2008 | Besser ............... H02J 7/35 327/518 |
| 2010/0102642 | A1 | 4/2010 | Odaohhara et al. |
| 2010/0317420 | A1* | 12/2010 | Hoffberg ......... G06Q 30/0282 463/1 |
| 2011/0241629 | A1* | 10/2011 | Jordan ............... H02M 3/07 320/166 |

(Continued)

FOREIGN PATENT DOCUMENTS

CN    108242888 A    7/2018

OTHER PUBLICATIONS

Choi, et al., "The improved Burst Mode in the Stand-by Operation of Power Supply", In proceedings of the Nineteenth Annual IEEE Applied Power Electronics Conference and Exposition., Feb. 22, 2004, pp. 426-432.

(Continued)

*Primary Examiner* — Yalkew Fantu
(74) *Attorney, Agent, or Firm* — Holzer Patel Drennan (57) ABSTRACT

Mitigation of audible output of one or more components in a charging circuit. A charging circuit may include a mitigation controller operative to monitor a frequency of voltage at an input of a charging circuit. The frequency of the voltage at the input node may result in a mitigation condition associated with audible output of one or more components of the charging circuit. In response to detection of the mitigation condition, the mitigation controller may temporarily disable the supply of power from charging circuit to a system load to mitigate (e.g., potentially eliminate) audible output of the circuit. During a time in which the charging circuit is disabled from supplying power to the system load, a battery of the device may supply power to the system load.

20 Claims, 6 Drawing Sheets

(56) References Cited

U.S. PATENT DOCUMENTS

2012/0206122 A1    8/2012  Dhuyvetter et al.
2013/0322365 A1*  12/2013  Garcia Martin .... H04W 72/048
                                                      370/329
2014/0229748 A1    8/2014  Li et al.
2016/0268841 A1*   9/2016  Zeier ........................ H02J 7/02

OTHER PUBLICATIONS

"International Search Report and Written Opinion Issued in PCT Application No. PCT/US20/031542", dated Jul. 2, 2020, 12 Pages.
Zhang, et al., "A Parabolic Voltage Control Strategy for Burst-Mode Converters with Constant Burst Frequency and Eliminated Audible Noise", In Journal of IEEE Transactions on Power Electronics, vol. 31, Issue 12, Dec. 2016, pp. 8572-8580.

* cited by examiner

MITIGATION OF AUDIBLE OUTPUT IN A CHARGING CIRCUIT

BACKGROUND

Many electronic devices have batteries that periodically need to be charged. These electronic devices may be connected to a charger to charge the device battery and supply power to the electronic device. In turn, chargers for devices have become common with the increased prevalence of mobile devices and the like. In turn, significant design considerations continue to be present for chargers and charging circuits for devices to, for example, reduce charger size, reduce device size, improve charging efficiency, and make chargers and/or charging circuits more user friendly.

SUMMARY

This disclosure relates to mitigating audible output in a charging circuit. The approaches described herein include monitoring a frequency of voltage at an input node of a charging circuit. The charging circuit can supply power to a system load. In turn, operation of the system load and/or charging circuit may result in a frequency of voltage being applied to one or more components in the charging circuit, which may lead to audible output (e.g., due to a piezoelectric effect of one or more components or the like). In turn, the present description includes determining that the frequency satisfies a mitigation condition and temporarily disabling the supply of power of the charging circuit to the system load (e.g., for a non-zero period of time) in response to determining that the frequency of the voltage at the input node satisfies the mitigation condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The present disclosure relates to mitigation of audible output of a charging circuit. For some circuit components (e.g., capacitors, inductors, etc.), a piezoelectric or microphonic effect may cause the component to generate an audible output (e.g., noise) that is perceivable to human users when a voltage that is applied to the component is at a certain voltage frequency or within a certain voltage frequency range. While such components may physically vibrate in response to any voltage frequency applied thereto, only certain frequencies applied to the component may result in audible output perceptible to humans. For example, audible output may occur when a vibrating component excites a substrate (e.g., a printed circuit board (PCB)) to which the component is secured. In an example, the component may vibrate at a natural frequency of the substrate, thus causing the substrate to resonate and produce audible output. As the audible output of such components may be irritating to human users, it is preferable to avoid operation of the charging circuit that generates such audible output. Moreover, the vibration corresponding to such audible output may contribute to mechanical failure of such components (e.g., due to fatigue in response to the vibration).

However, approaches to mitigate audible output of components have limitations. For example, a contemplated approach is to provide reinforced physical connection structures between the component and a substrate to which the component is secured (e.g., "stilts"), to provide a dampening material between the component and a substrate, use of non-ferroelectric components, or superimposing a cancelling voltage that counteracts one or more frequencies that cause audible output to mitigate the audible output of such components. However, use of stilts or dampening material generally results in greater height of the components relative to the substrate (referred to as the "z height"). In many contexts, packaging concerns and/or a desire to minimize the size of devices incorporating such components limit the available z height, thus precluding the use of these contemplated solutions. Moreover, use of non-ferroelectric components may result in components of increased size and cost. Further still, superimposing a cancellation signal may require inclusion of relatively sophisticated electronics and result in inefficient operation by utilizing power to counteract the frequency that causes audio output.

However, as will be discussed in greater detail below, the approach described herein uses a mitigation controller to monitor a frequency of voltage at an input node of a charging circuit to determine if a mitigation condition is satisfied. The mitigation condition may have one or more mitigation condition parameters. When the monitored frequency of the voltage at the input node satisfies the one or more mitigation condition parameters, the mitigation condition is determined to be satisfied. In response to the mitigation condition being satisfied by the monitored voltage, the mitigation controller temporarily modifies the charging circuit to mitigate (e.g., and possible prevent) perceptible audible output of the charging circuit. The modification may include temporarily changing a characteristic of the supply of power or disabling the supply of power. Disabling the charging circuit may include any approach in which the charging circuit no longer supplies power to a system load of an electronic device. The charging circuit may be reenabled by the mitigation controller in response to a determination that the condition is no longer satisfied, for a predetermined non-zero period of time, for a random period of time, or for a pseudorandom period of time within a window of predetermined periods of time.

Figure 1:
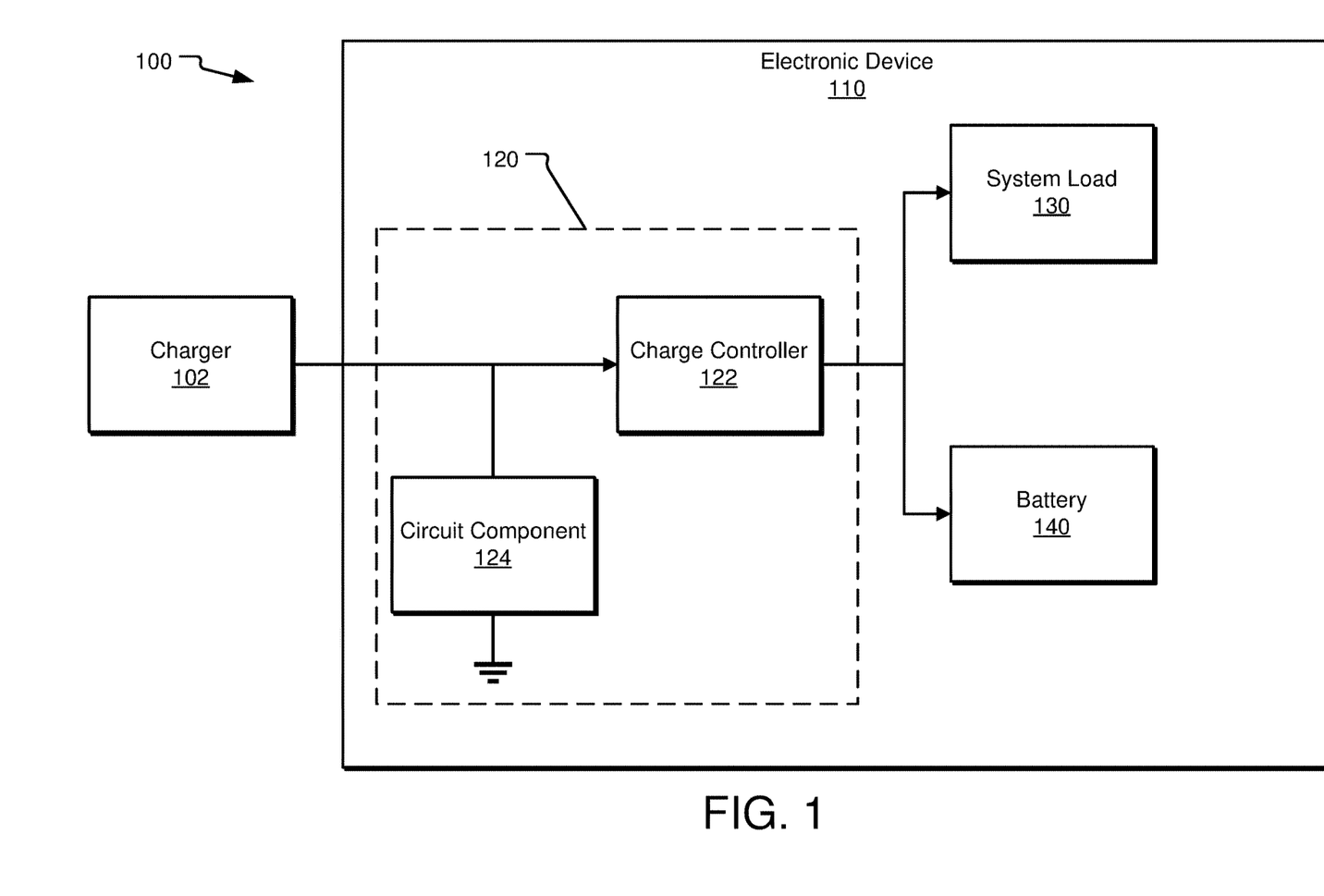
FIG. 1 illustrates an example charging system susceptible to audible output during operation.

FIG. 1 illustrates an example environment 100 in which the disclosed technology may be used. An electronic device 110 includes a charging circuit 120. The charging circuit 120 is electronically coupled with a battery 140 of the electronic device 110. In addition, the charging circuit 120 is electronically coupled with a system load 130 of the electronic device 110 to supply power to the electronic device 110. The charging circuit 120 includes a charge controller 122 for controlling the supply of power to the output of the charging circuit 120. The charge controller 122 may include a charging integrated circuit as described in greater detail below. In addition, the charging circuit 120 may be electronically coupled with a charger 102, which provides power to the charging circuit 120 when electronically coupled with the electronic device 110. For example, the charger 102 may comprise an external power source that includes a pluggable interface or the like for selective engagement with the electronic device 110 to supply power to the charging circuit 120.

In addition, the charging circuit 120 includes a circuit component 124. The at least one circuit component may be any appropriate electrical component disposed in the charging circuit 120 for any appropriate purpose. For example, the circuit component 124 may comprise one or more capacitors. The circuit component 124 may comprise an input capacitor to help filter noise from the input node of the charging circuit 120. Additionally or alternatively, the circuit component 124 may comprise one or more inductors. The circuit component 124 may include any other combination of components including resistors, diodes, inductors, transistors, microcontrollers, or the like. Accordingly, while the circuit component 124 is described herein as a capacitor for illustration of the present technology, it is not intended to limit the scope of the disclosure.

For example, where the circuit component 124 is a capacitor, exposure to certain conditions may induce a piezoelectric effect in the physical construction of the capacitor. In turn, a frequency of a voltage applied to the capacitor may result in the capacitor mechanically vibrating. This vibration may result in an audible output of the capacitor and/or substrate to which the capacitor is secured, which may be perceived by human users near the electronic device 110.

Figure 2:
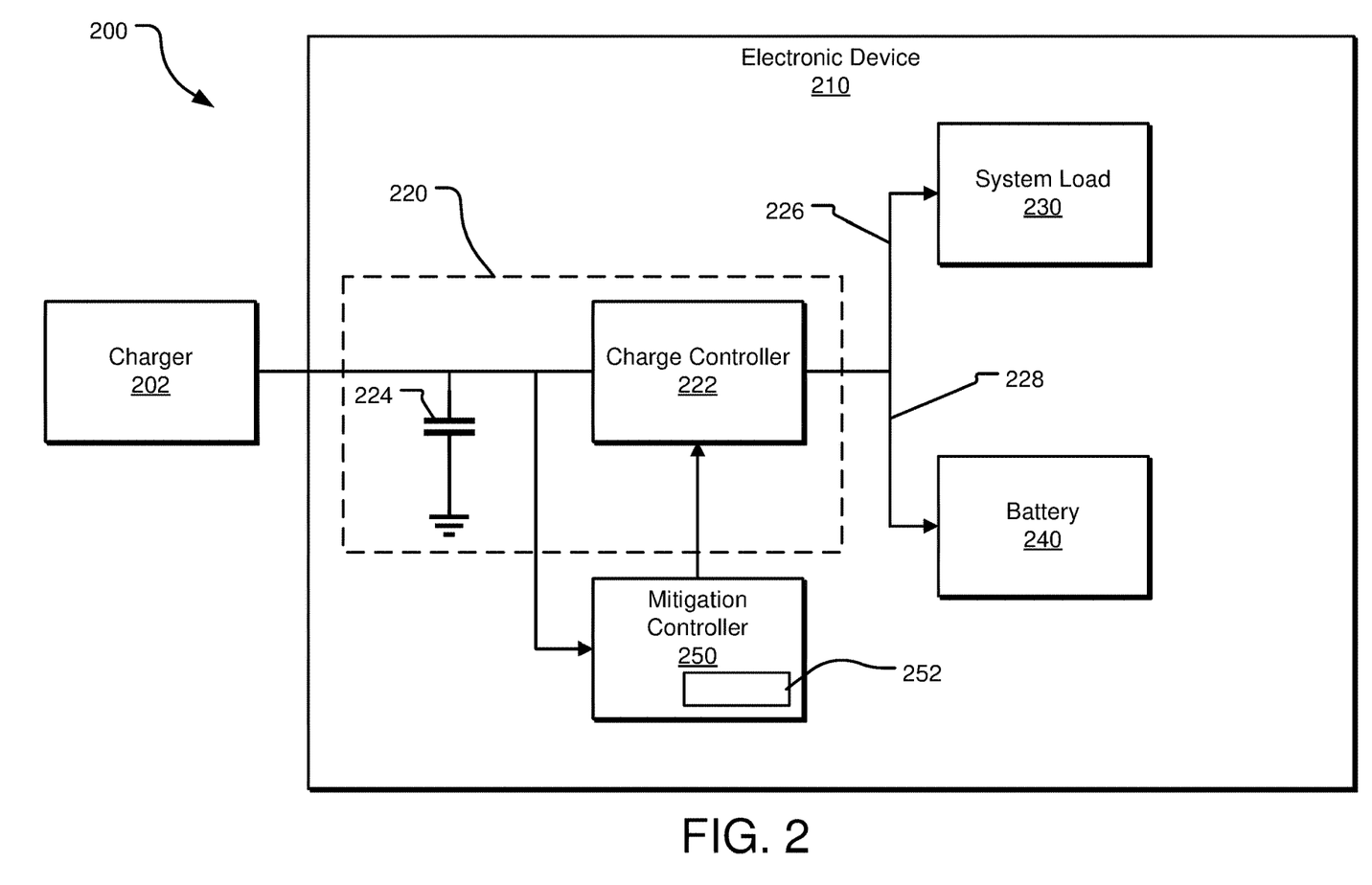
FIG. 2 illustrates an example charging system with a mitigation controller to mitigate audible output of the system.

Accordingly, with reference to FIG. 2, an example of a system 200 is illustrated which mitigates (e.g., reduce or possibly eliminate) audible output of a charging circuit 220. In FIG. 2, a charging circuit 220 receives power from a charger 202 that may be selectively engageable with an electronic device 210 in which the charging circuit 220 is provided. While not illustrated in FIG. 2, it is to be understood that the charging circuit 220 may be provided external to the electronic device 210 such that, for example, the charging circuit 220 is disposed in the charger 202 or other location external to the electronic device 210. The charging circuit 220 includes a capacitor 224 electronically coupled with an input node of the charging circuit 220. However, according to the discussion above, the capacitor 224 may additionally or alternatively be any appropriate circuit component susceptible to audible output. The charging circuit 220 includes a charge controller 222 that controls the charging circuit 220 to supply power to an output of the charging circuit 220. In turn, the output of the charging circuit 220 is electronically coupled with a battery 240 to supply power for charging the battery and is electronically coupled with a system load 230 to supply power for operation of the electronic device 210. The charge controller 222 may include any appropriate hardware and/or circuit topology related to the control for the charging circuit 220. Examples of a charge controller 222 may include a buck converter, a boost converter, a buck-boost converter, or any other appropriate charging circuit topology.

A mitigation controller 250 is electronically coupled with an input node of the charging circuit 220. The mitigation controller 250 monitors a frequency of voltage at the input node. In turn, the mitigation controller 250 determines if a mitigation condition exists at the input node. The mitigation condition is defined by one or more mitigation condition parameters. In one example, when one or more of the mitigation condition parameters are satisfied, the mitigation controller 250 determines that the mitigation condition is satisfied. In other examples, all of the one or more mitigation condition parameters must be satisfied for mitigation controller 250 to determine the mitigation condition is satisfied. The mitigation condition may be associated with the vibration of the capacitor 224 such that audible output is created. That is, the mitigation condition parameters may define a condition in which audible output of the capacitor occurs, is likely to occur, or is going to occur. The mitigation controller 250 is electronically coupled with the charging circuit 220 (e.g., the charge controller 222) to control the supply of power from the charging circuit 220. If the mitigation controller 250 determines the monitored voltage at the input node satisfies the mitigation condition, the mitigation controller 250 temporarily modifies the supply of power from the charging circuit 220 to the output node of the charging circuit. This may include disabling the charge controller 222. Alternatively, other means (e.g., switches or the like) may be activated to disable or modify the supply of power from the charging circuit 220 to the system load 230. In addition, the mitigation controller 250 may modify the supply of power (e.g., increase or decrease the power supplied). Furthermore, the mitigation controller 250 may also enable (e.g., reenable) the supply of power from the charging circuit 220 to the system load 230. The enabling of the supply of power from the charging circuit 220 to the system load 230 by the mitigation controller 250 may be in response to a determination that the mitigation condition is no longer present at the input node. Alternatively, reenabling the supply of power from the charging circuit 220 to the system load 230 by the mitigation controller 250 may occur after a predetermined, random, or pseudorandom non-zero period of time.

The voltage frequency present at the input node of the charging circuit 220 may be caused by any one or more of multiple factors. For example, the system load 230 may operate such that a frequency is induced at the output node of the charging circuit 220. The frequency of the voltage may correspond to one or more frequencies at which components of the device comprising the system load 230 operate. This frequency is reflected across the charge controller 222 such that a frequency exists in the voltage at the input node of the charging circuit 220. For example, as the voltage of the system load 230 changes at a given frequency, a corresponding (e.g., inverse) voltage frequency may be created at the input node of the charging circuit 220. In addition, other factors may result in a frequency of the voltage at the input node including without limitation, noise induced from other internal components of the device (e.g., due to transient effects or the like), noise induced from other external factors, noise present in a supply voltage from the charger 202, or any other source of noise which may be induced in the charging circuit 220.

The occurrence of a mitigation condition associated with audible output of a component in the charging circuit 220 may be more prevalent when the battery 240 of the system is at or near full charge. When the battery 240 is not fully charged, the current draw associated with providing power to the system load 230 as well as providing charging power to the battery 240 may result in the charge controller 222

(e.g., buck converter) to operate in continuous mode. Additionally, in this condition, the battery 240 itself provides a large capacitance value to the charging circuit 220. In turn, voltage frequencies that satisfy the mitigation condition may be more effectively filtered from the charging circuit 220. However, as the battery 240 is charged to full capacity or nears full capacity, the charge controller 222 begins to operate in discontinuous mode. During discontinuous mode of the charge controller 222, increased noise (e.g., due to transient effects during the switching of the charge controller 222 in discontinuous mode) may be introduced into the charging circuit 220, which may occur in or otherwise result in a voltage frequency in a frequency range associated with the condition monitored by the mitigation controller 250. Moreover, when the battery 240 is near full charge, the capacitance the battery 240 provides to the charging circuit 220 is reduced, thus reducing any filtering effects provided.

In an example, the mitigation controller 250 monitors the frequency of the voltage at the input node of the charging circuit 220 using a transformation of the voltage into the frequency domain. Specifically, a fast Fourier transform (FFT) may be performed such that the monitored frequency is represented in the frequency domain. In this regard, a voltage amplitude at various frequencies is represented in the FFT of the voltage at the input node, which may provide less computational overhead in relation to the monitoring, thus improving efficiency and responsiveness of the mitigation controller 250.

In any regard, the mitigation controller 250 is configured to sample the voltage at the input node of the charging circuit 220 to monitor the frequency of the voltage. The mitigation controller 250 calculates the FFT of the voltage based on the voltage samples measured at the input node. In one example, the mitigation controller 250 samples the voltage at a sampling frequency that is twice the frequency of the highest frequency of the mitigation condition to ensure sufficiently accurate sampling of the measured frequency.

For example, the mitigation condition is associated with potential audible output of the charging circuit 220. This means one mitigation condition parameter may be a mitigation condition frequency parameter that includes a frequency or range of frequencies. Specifically, the range of frequencies of the mitigation condition frequency parameter may correspond to one or more frequencies or frequency ranges in the human audible frequency range of a typical human, which may be no less than about 20 HZ and not greater than about 20 kHz. However, the frequency of the mitigation condition frequency parameter need not directly correspond to the audible frequency range of a typical human. For example, due to various factors such as dampening of the component and/or substrate, the mitigation condition frequency parameter may be a more limited set of frequencies and/or frequency ranges within the audible frequency range of a typical human. Further still, the mitigation condition frequency parameter may be a frequency outside the audible frequency range that creates an audible vibration of the charging circuit 220 within the audible frequency range. For example, a 30 kHz voltage frequency may result in a circuit component vibrating within the audible frequency range of from between 20 Hz and 20 kHz, and thus the mitigation condition frequency parameter may include 30 kHz. Further still, the mitigation condition may be based on a mitigation condition volume parameter comprising a decibel threshold related to the volume of the audible output. For instance, it may be determined (e.g., through testing described in greater detail below) that only audible output above the decibel threshold satisfies the mitigation condition. As such, audible output of a volume below the decibel threshold may not satisfy the condition. The decibel threshold need not be consistent over the ranges of the other mitigation condition parameters, but rather may vary with one or more other mitigation condition parameters. For instance, a first decibel threshold may be established for a first frequency and a second decibel threshold may be established for a second frequency such that the first decibel threshold is different than the second decibel threshold. In turn, the decibel threshold of the mitigation condition volume parameter may be a function of one or more other mitigation condition parameters.

Additionally or alternatively, additional mitigation condition parameters may be monitored in relation to the mitigation condition. For example, a mitigation condition amplitude parameter may also be defined for the mitigation condition. In turn, a voltage amplitude may be monitored (e.g., in the FFT of the voltage frequency at the input node) such that a measured amplitude of a voltage at a frequency may be required to exceed a threshold value prior to the mitigation condition amplitude parameter being satisfied. That is, the mitigation condition amplitude parameter may include a threshold value of a predetermined voltage amplitude at a predetermined voltage frequency that must be exceeded for the mitigation condition amplitude parameter to be satisfied. For example, the mitigation controller 250 may determine that a frequency of a voltage at the input is present within a predefined frequency range for the mitigation condition frequency parameter. However, the voltage at this frequency may have a relatively low amplitude in the frequency domain, which may not exceed the threshold value of the mitigation condition amplitude parameter. In this regard, despite the identification of a voltage frequency that satisfies the mitigation condition frequency parameter, the mitigation condition may not be satisfied absent the amplitude of the voltage at this frequency exceeding the threshold value of the mitigation condition amplitude parameter such that the mitigation controller 250 does not disable the charging circuit 220. This may assist in reduction of identification of false positives by the mitigation controller 250. However, if the amplitude of voltage at the frequency within the mitigation condition frequency parameter exceeds the threshold value of the mitigation condition amplitude parameter, both parameters of the mitigation condition may be present such that the mitigation condition is satisfied. In turn, the mitigation controller 250 disables the charging circuit 220. The mitigation condition amplitude parameter need not be constant over the mitigation condition frequency parameter. Accordingly, each respective frequency value within the mitigation condition frequency parameter may have a respective threshold value for the mitigation condition amplitude parameter that results in the satisfaction of the mitigation condition. For example, the threshold value may generally be lower at lower frequencies and may generally increase at higher frequencies. In this regard, the mitigation condition amplitude parameter may be a function of one or more other mitigation condition parameters.

In other examples, the mitigation condition may not directly correspond to audible output of a component actually occurring. Rather, the mitigation condition may be associated with mitigation condition parameters trending toward a circumstance in which audible output may occur. That is, the mitigation condition may include identification of a trend in the monitored frequency that indicates an audible output is likely to occur if the charging circuit 220 continues to operate. In this regard, disabling the charging circuit 220 may occur prior to audible output of the charging circuit 220 occurring in response to identification of imminent or likely audible output of the charging circuit 220.

The mitigation controller 250 may be hardware operative to monitor for the mitigation condition of the frequency of the voltage at the input node. For example, the mitigation controller 250 may include appropriate circuit components that embody logic for determining if the condition is present. Alternatively, the mitigation controller 250 may be a microcontroller comprising software for executing the logic for determining if the mitigation condition is present. As such, the mitigation controller 250 may be a combination of hardware and software. In one example, the mitigation controller 250 includes or is otherwise electronically coupled with a memory 252 that stores information regarding the mitigation condition (e.g., one or more mitigation condition parameters) of the input node associated with audible output of the capacitor 224. In an example, the definition of the mitigation condition may be stored in the BIOS of the electronic device 210. In any regard, a microprocessor of the mitigation controller 250 accesses the memory 252 to determining if the measured frequency of the voltage at the input nodes satisfies the mitigation condition. For example, the memory 252 may comprise a look-up table that defines when the mitigation condition is satisfied (e.g., one or more dimensions of the lookup table correspond to mitigation condition parameters monitored by the mitigation controller 250).

In an example, the mitigation controller 250 is an embedded controller for the charging circuit 220. For example, the charging circuit 220 may include the embedded controller to monitor operation of the charging circuit 220 (e.g., to assist in reduction of overcharging or otherwise creating an undesirable charging condition and/or power supply to a device). In turn, the embedded controller has existing functionality to monitor the voltage at the input node of the charging circuit 220 (e.g., in connection with monitor charging power or the like). Accordingly, while the mitigation controller 250 is depicted as being external to the charging circuit 220, it may be that the mitigation controller 250 is a part of the charging circuit 220 (e.g., provided with the charge controller 222).

In such an example where the mitigation controller 250 includes configurable software, the mitigation condition parameters of the mitigation condition are configurable by modification of a definition of the mitigation condition in a memory. This may be particularly useful in scenarios in which the audible output of the charging circuit 220 is not be known at the time of production of the charging circuit 220. For example, a number of variables typically factor into the audible output of a capacitor 224. These variables relate to the component 224 as well as other factors such as the location of the component, mounting of the component, the substrate to which the component is secured, or the like. For example, a capacitor 224 may vibrate within the audible range of most humans but may not actually produce perceptible audible output in the entire audible frequency range of a human. In turn, the mitigation condition frequency parameter may be tuned to identified frequencies at which a capacitor 224 generates sufficient audible output to be perceptible by a user. In turn, the mitigation condition may be satisfied when the frequency of the voltage at the input node occurs in the frequencies of the mitigation condition frequency parameter. However, given the complexity of such vibrating systems it is difficult or costly to determine which such frequencies should be included in the mitigation condition frequency parameter at the design stage of the charging circuit 220. In turn, having configurable mitigation condition parameters in a mitigation condition definition may allow a charging circuit to be tested to determine under what circumstances audible output is generated by the charging circuit 220. For example, various input voltage frequencies and/or amplitudes may be applied to the system and the resulting audible output may be measured. Limits on allowable audible output may be set such that corresponding mitigation condition parameters (e.g., a mitigation condition frequency parameter and a mitigation condition amplitude parameter) corresponding to unacceptable audio output may be identified. The limit on the allowable audio output may be defined as a decibel threshold as discussed above. In this regard, the decibel threshold may vary with the mitigation condition frequency parameter such that different limits for audio output volumes may be provided to different frequencies of audio output. The result of such testing may then be used to configure the configurable mitigation condition parameters of a mitigation condition definition to define the mitigation condition as including frequencies and/or amplitudes of concern identified in the testing.

Figure 3:
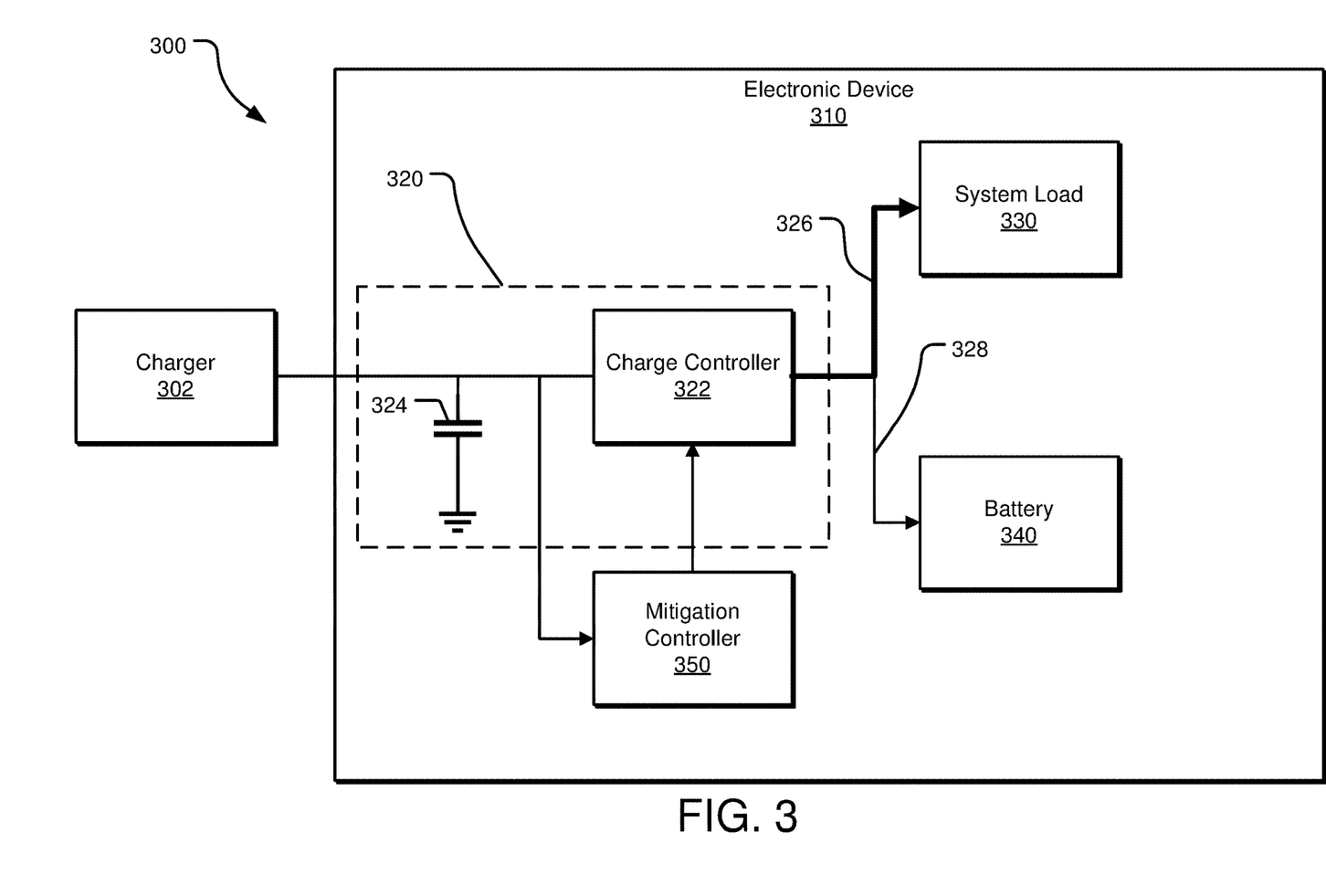
FIG. 3 illustrates an example charging system in a first state of operation in which the charging circuit is enabled to supply power to a system load.

With further reference to FIG. 3, operation of a charging circuit 320 in which a mitigation condition is not detected is depicted. The charging circuit 320 is operative to supply power to a system load 330 via a device power supply path 326 shown in bold. Unless explicitly stated otherwise, the purpose and function of elements shown in FIG. 3 may be the same or similar to those of like-named elements in FIG. 2. In this regard, a mitigation controller 350 monitoring a frequency of voltage at an input node of the charging circuit 320 determines in the circumstances depicted in FIG. 3 that the mitigation condition is not detected, and the charging circuit 320 is enabled by the mitigation controller 350. While not shown in bold, it is to be understood that a battery charging path 328 between the charging circuit 320 and a battery 340 is also supplied power by the charging circuit 320. In this regard, the battery 340 is also charged when the charging circuit 320 is enabled.

Figure 4:
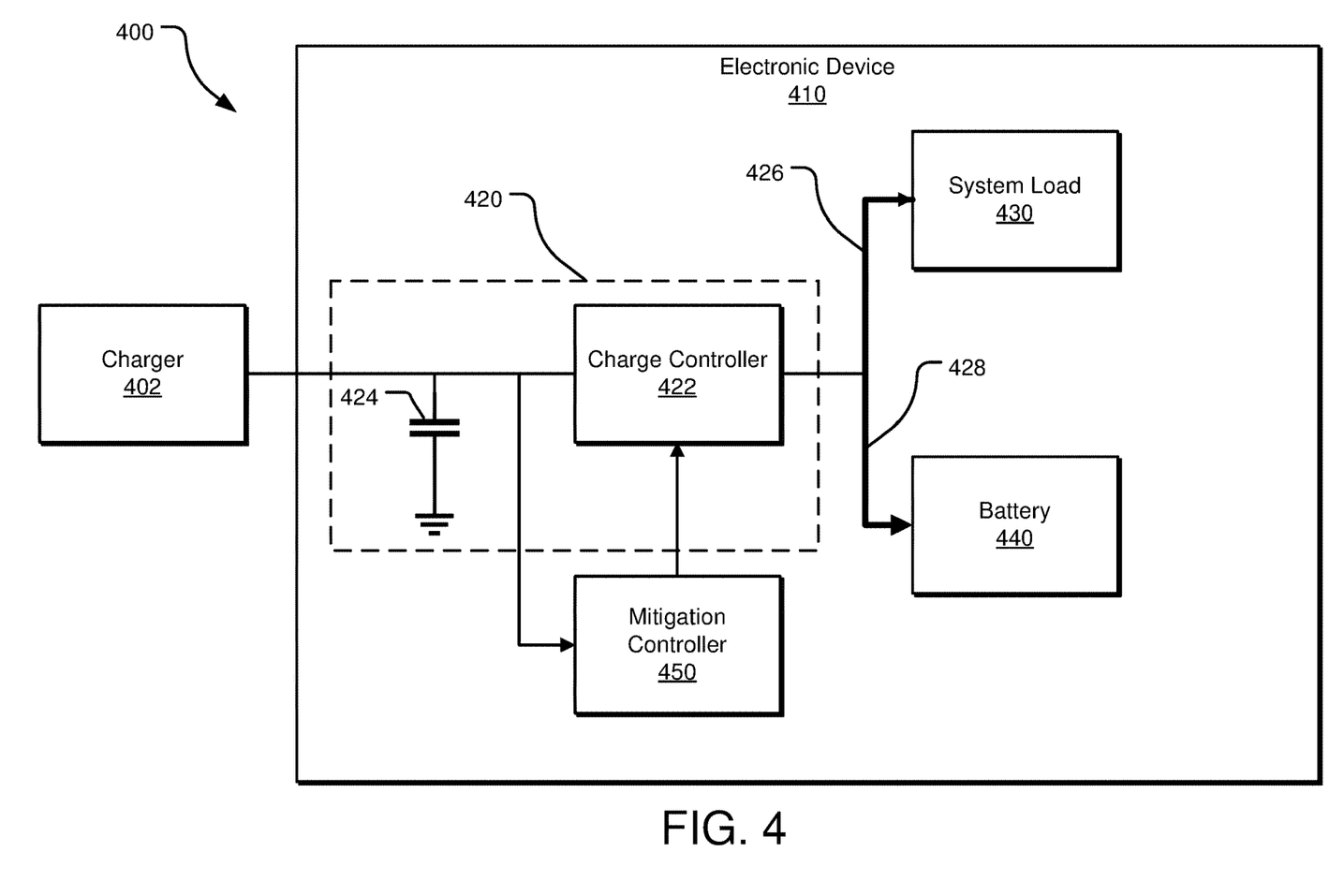
FIG. 4 illustrates an example charging system in a second state of operation in which the charging circuit is disabled by the mitigation controller in response to determining a mitigation condition is satisfied.

In contrast, FIG. 4 depicts operation of a charging circuit 420 in which a mitigation condition is detected. Unless explicitly stated otherwise, the purpose and function of elements shown in FIG. 4 may be the same or similar to those of like-named elements in FIGS. 2 and 3. In FIG. 4, the charging circuit 420 is disabled by the mitigation controller 450. With the charging circuited 420 disabled, a battery 440 of an electronic device 410 supplies power to a system load 430 via a battery discharge path 428 and a device power supply path 426 as shown in bold in FIG. 4.

The mitigation controller 450 is also operative to enable (e.g., reenable) the charging circuit 420. The enabling of the charging circuit 420 can be in response to determining that the condition is no longer satisfied. Alternatively, the disabling of the charging circuit 420 can be for a predetermined period of time (which is non-zero). Thus, upon disabling the charging circuit 420 in response to the monitored frequency of the voltage satisfying the mitigation condition, the charging circuit 420 reenables the supply of power from the charging circuit 420 after the predetermined period of time. The predetermined period of time may be configurable at the mitigation controller 450. Preferably, the predetermined period of time is not so long so as to be perceived by the user. In addition, the predetermined period of time should not correspond to a frequency within the mitigation condition frequency parameter. For example, a predetermined period of time of 1 second may correspond to a frequency of 1 Hz, which is generally outside the mitigation condition frequency parameter. As such a predetermined period of time corresponding to a frequency outside the mitigation condition frequency parameter avoids further inducing frequencies that fall within the frequency parameter, thus avoiding induced audio output of the charging circuit 420. In yet another example, the period of time that the mitigation controller 450 disables the charging circuit 420 is a random value or pseudo-random value within some defined window of non-zero time periods to avoid inducing a frequency within the frequency parameter of the mitigation condition.

Figure 5:
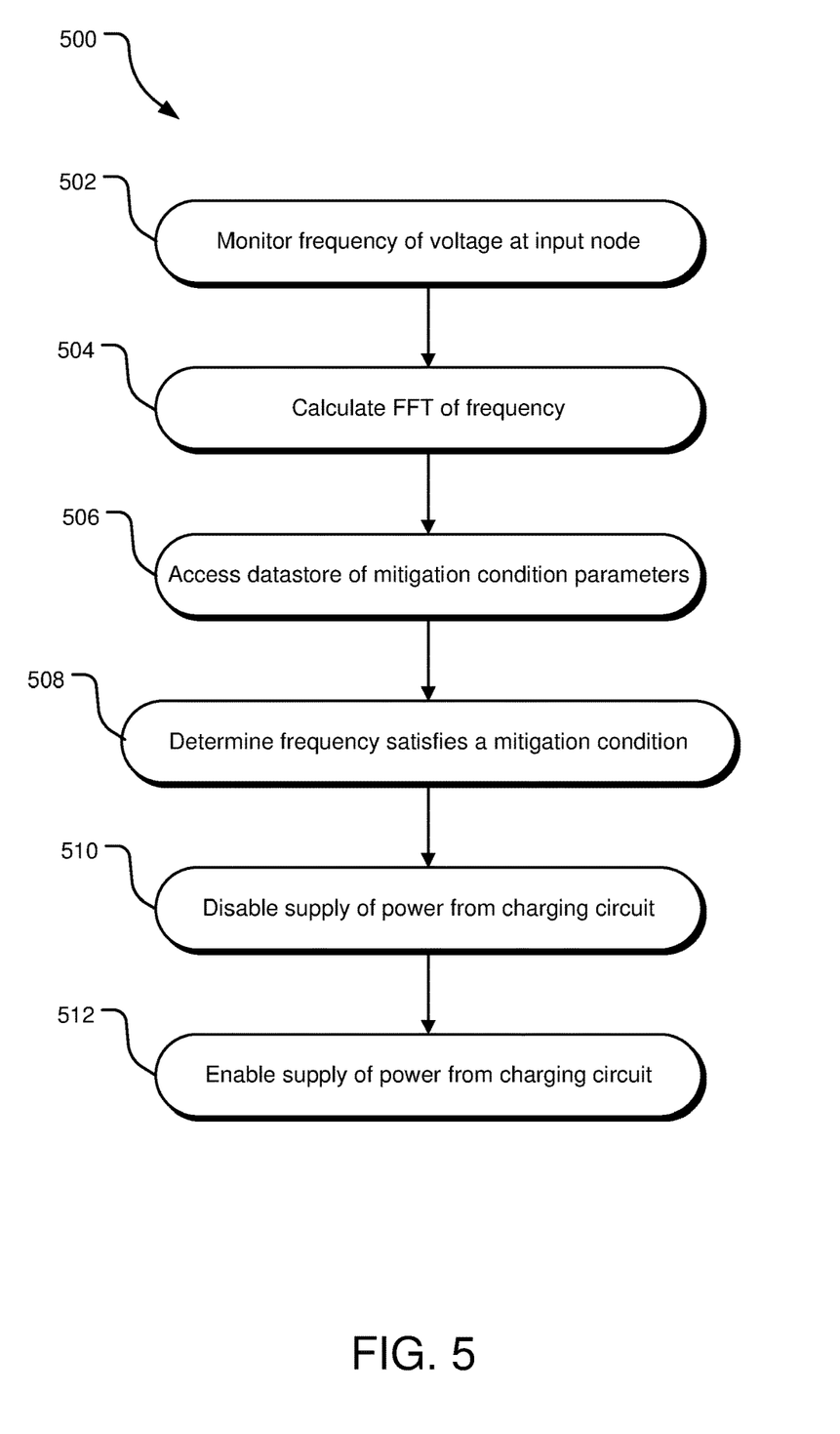
FIG. 5 illustrates example operations for mitigation of audible output of a charging system.

FIG. 5 depicts an example operations 500 for mitigation of audible output of a charging system. A monitoring operation 502 monitors a frequency of voltage at an input node of a charging circuit. A calculating operation 504 calculates an FFT of the frequency of the voltage. An accessing operation 506 may access a datastore that includes information regarding a mitigation condition (e.g., one or more mitigation condition parameters).

In turn, a determining operation 508 determines if the monitored frequency of the voltage at the input node satisfies the mitigation condition. In response to determining that the monitored frequency of the voltage satisfies the mitigation condition, a disabling operation 510 disables the supply of power from the charging circuit to a system load. Moreover, an enabling operation 512 may reenable the supply of power from the charging circuit to the system load. The enabling operation 512 may be in response to determining that the mitigation condition is no longer satisfied or may occur after a predetermined, non-zero period of time has elapsed from the disabling operation 510.

Figure 6:
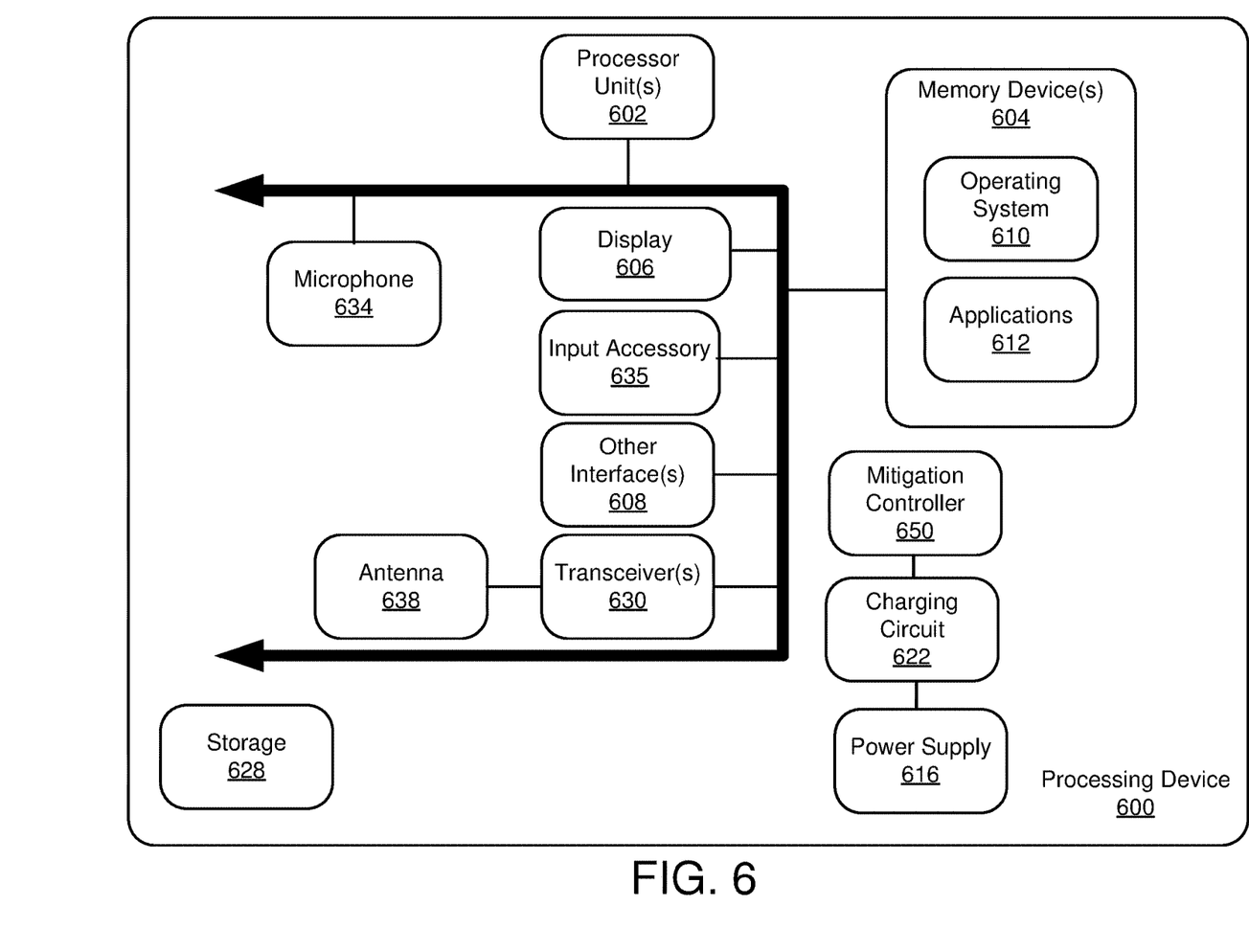
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes one or more processor unit(s) 602, memory 604, a display 606, and other interfaces 408 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processor unit(s) 602, although it should be understood that other operating systems may be employed.

One or more applications 612 are loaded in the memory 604 and executed on the operating system 610 by the processor unit(s) 602. Applications 612 may receive input from various input local devices such as a microphone 634, input accessory 635 (e.g., keypad, mouse, stylus, touchpad, gamepad, racing wheel, joystick). Additionally, the applications 612 may receive input from one or more remote devices such as remotely-located smart devices by communicating with such devices over a wired or wireless network using more communication transceivers 630 and an antenna 638 to provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., the microphone 634, an audio amplifier and speaker and/or audio jack), and storage devices 628. Other configurations may also be employed.

The processing device 600 further includes a power supply 616. The power supply may be electronically coupled with a charge controller 622. The charge controller 622 may also be electronically coupled to a mitigation controller 650. In turn, the power supply 616 is powered by one or more batteries or other power sources and provides power to other components of the processing device 600 in accordance with the approaches described herein. The power supply 616 may also be connected to an external power source (not shown) that overrides or recharges the built-in batteries or other power sources.

In an example implementation, the mitigation controller 650 for monitoring for a mitigation condition of a frequency of voltage at an input node of a charging circuit may include hardware and/or software embodied by instructions stored in the memory 604 and/or the storage devices 628 and processed by the processor unit(s) 602. The memory 604 may be the memory of a host device or of an accessory that couples to the host.

In any of the foregoing examples, one or more components (e.g., the controller) may be executed by a processing device 600 as depicted in FIG. 6. The processing device 600 may include a variety of tangible processor-readable storage media and intangible processor-readable communication signals. Tangible processor-readable storage can be embodied by any available media that can be accessed by the processing device 600 and includes both volatile and non-volatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method of mitigating audible output of a charging circuit that supplies power to a system load includes monitoring a frequency of voltage at an input node of a charging circuit that supplies power to the system load, determining that the monitored frequency satisfies a mitigation condition, and modifying a supply of power of the charging circuit to the system load for a non-zero period of time, responsive to the determining that the mitigation condition is satisfied.

Another example method of any preceding method is provided wherein the mitigation condition is associated with an audible output of the charging circuit. In an example, the mitigation condition includes the frequency being in a human audible frequency range.

Another example method of any preceding method is provided that further includes calculating a fast Fourier transform of the frequency of the voltage. In an example method, the mitigation condition includes mitigation condition parameters including a predetermined voltage frequency and a predetermined voltage amplitude.

Another example method of any preceding method is provided that further includes supplying power from a battery to the system load during the modifying operation.

Another example method of any preceding method is provided that further includes disabling the supply of power of the charging circuit to the system load for a non-zero period of time. The method may also include enabling the supply of power of the charging circuit to the system load after the non-zero period of time.

An example charging system provides mitigation of audible output. The system includes a charging circuit configured to supply power to a system load and at least one component electronically coupled with an input node of the charging circuit. A mitigation controller electronically coupled with the input node of the charging circuit monitors a frequency of voltage at the input node and determines that the monitored frequency satisfies a mitigation condition. The mitigation controller is operative to modify a supply of power from the charging circuit for a non-zero period of time in response to determining the monitored frequency satisfies the mitigation condition.

Another example charging system of any preceding system is provided wherein the at least one component generates an audible output for at least one frequency of voltage, and the mitigation condition is at least in part based on the at least one frequency of the voltage. In an example, the mitigation condition includes the frequency being in a human audible frequency range.

Another example charging system of any preceding system is provided wherein the mitigation controller is operative to calculate a fast Fourier transform of the frequency of the voltage. In an example, the mitigation condition includes a predetermined voltage frequency and a predetermined voltage amplitude.

Another example charging system of any preceding system is provided that further includes a battery in operative communication with the system load to supply power when the charging circuit is modified.

Another example charging system of any preceding system is provided wherein the mitigation controller is operative to disable the supply of power from the charging circuit for a non-zero period of time in response to determining the monitored frequency satisfies the mitigation condition. In an example, the mitigation controller is operative to enable the supply of power of the charging circuit to the system load after the non-zero period of time.

An example device provides mitigation of audible output. The device includes a charging circuit electronically coupled with a system load to supply power to the system load and electronically coupled with a battery of the device to supply power to the battery to charge the battery. A power supply path is provided to a system load of the device. At least one component in the charging circuit generates an audible output for at least one frequency of voltage. The device includes a mitigation controller electronically coupled with an input node of the charging circuit to monitor a frequency of voltage at the input node and determine that the monitored frequency satisfies a mitigation condition based on the at least one frequency of voltage in which the at least one component generates audible output. The mitigation controller is operative to modify the supply of power from the charging circuit to the system load for a non-zero period of time in response to determining the frequency satisfies the mitigation condition.

Another example device of any preceding device is provided wherein the mitigation condition includes the frequency being in a human audible frequency range.

Another example device of any preceding device is provided wherein the mitigation controller is operative to disable the supply of power from the charging circuit to the system load for a non-zero period of time in response to determining the frequency satisfies the mitigation condition and enable the supply of power of the charging circuit to the system load after the non-zero period of time.

Another example device of any preceding device is provided wherein the battery is operative to supply power to the power supply path to the system load of the device when the charging circuit is disabled.

Another example device provides mitigation of audible output. The device includes a means for monitoring a frequency of voltage at an input node of a charging circuit that supplies power to the system load. The device also includes a means for determining that the monitored frequency satisfies a mitigation condition. The device also includes a means for modifying a supply of power of the charging circuit to the system load for a non-zero period of time, responsive to the determining that the mitigation condition is satisfied.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of mitigating audible output of a charging circuit that supplies power to a system load, the method comprising:
   monitoring a frequency of voltage at an input node of the charging circuit that supplies power to the system load;
   determining that the monitored frequency satisfies a mitigation condition; and
   modifying a supply of power of the charging circuit to the system load for a non-zero period of time, responsive to the determining that the mitigation condition is satisfied.

2. The method of claim 1, wherein the mitigation condition is associated with an audible output of the charging circuit.

3. The method of claim 2, wherein the mitigation condition includes the frequency being in a human audible frequency range.

4. The method of claim 1, further comprising:
   calculating a fast Fourier transform of the frequency of the voltage.

5. The method of claim 4, wherein the mitigation condition includes mitigation condition parameters including a predetermined voltage frequency and a predetermined voltage amplitude.

6. The method of claim 1, further comprising:
   supplying power from a battery to the system load during the modifying operation.

7. The method of claim 1, wherein the modifying operation comprises:
   disabling the supply of power of the charging circuit to the system load for a non-zero period of time.

8. The method of claim 7, further comprising:
   enabling the supply of power of the charging circuit to the system load after the non-zero period of time.

9. A charging system with mitigation of audible output, the system comprising:
   a charging circuit configured to supply power to a system load;
   at least one component electronically coupled with an input node of the charging circuit; and
   a mitigation controller electronically coupled with the input node of the charging circuit to monitor a frequency of voltage at the input node and determine that the monitored frequency satisfies a mitigation condition, wherein the mitigation controller is operative to modify a supply of power from the charging circuit for a non-zero period of time in response to determining the monitored frequency satisfies the mitigation condition.

10. The system of claim 9, wherein the at least one component generate an audible output for at least one frequency of voltage, and wherein the mitigation condition is at least in part based on the at least one frequency of the voltage.

11. The system of claim 10, wherein the mitigation condition includes the frequency being in a human audible frequency range.

12. The system of claim 9, wherein the mitigation controller is operative to calculate a fast Fourier transform of the frequency of the voltage.

13. The system of claim 12, wherein the mitigation condition includes a predetermined voltage frequency and a predetermined voltage amplitude.

14. The system of claim 9, further comprising:
   a battery in operative communication with the system load to supply power when the charging circuit is modified.

15. The system of claim 9, wherein the mitigation controller is operative to disable the supply of power from the charging circuit for a non-zero period of time in response to determining the monitored frequency satisfies the mitigation condition.

16. The system of claim 15, wherein the mitigation controller is operative to enable the supply of power of the charging circuit to the system load after the non-zero period of time.

17. A device having a charging system with mitigation of audible output, the system comprising:
   a charging circuit electronically coupled with a system load to supply power to the system load and electronically coupled with a battery of the device to supply power to the battery to charge the battery;
   a power supply path to a system load of the device;
   at least one component in the charging circuit that generates an audible output for at least one frequency of voltage; and
   a mitigation controller electronically coupled with an input node of the charging circuit to monitor a frequency of voltage at the input node and determine that the monitored frequency satisfies a mitigation condition based on the at least one frequency of voltage in which the at least one component generates audible output, wherein the mitigation controller is operative to modify the supply of power from the charging circuit to the system load for a non-zero period of time in response to determining the frequency satisfies the mitigation condition.

18. The device of claim 17, wherein the mitigation condition includes the frequency being in a human audible frequency range.

19. The device of claim 17, wherein the mitigation controller is operative to disable the supply of power from the charging circuit to the system load for a non-zero period of time in response to determining the frequency satisfies the mitigation condition and enable the supply of power of the charging circuit to the system load after the non-zero period of time.

20. The device of claim 17, wherein the battery is operative to supply power to the power supply path to the system load of the device when the charging circuit is disabled.

* * * * *